Feb. 23, 1965 H. J. HELD 3,170,777
MOUNTING FOR FILTER TUBES
Filed Aug. 14, 1961 2 Sheets-Sheet 1

INVENTOR.
HANS J. HELD
BY Arthur H. Seidel
ATTORNEY

Feb. 23, 1965     H. J. HELD     3,170,777
MOUNTING FOR FILTER TUBES
Filed Aug. 14, 1961     2 Sheets-Sheet 2

INVENTOR.
HANS J. HELD
BY Arthur H. Seidel
ATTORNEY

United States Patent Office 3,170,777
Patented Feb. 23, 1965

3,170,777
MOUNTING FOR FILTER TUBES
Hans J. Held, Lake Success, N.Y., assignor to The Ducon Company, Inc., Mineola, N.Y., a corporation of New York
Filed Aug. 14, 1961, Ser. No. 131,376
7 Claims. (Cl. 55—490)

This invention relates to a mounting for filter tubes adapted to be disposed in a dust collector for removing finely divided solid particles from air or other gases.

A wide variety of dust collectors utilizing filter tubes have been proposed heretofore. In particular, a wide variety of dust collectors are presently available which include cloth filter tubes which remove dust particles by the passage of dust laden air through the cloth filter tubes. In order to filter dust laden air of a high temperature, it is necessary for the filter tubes to be made from a temperature resistant material such as fiberglass. However, experience has demonstrated that fiberglass filter tubes have a very low tensile strength and cannot sustain the movement associated with cleaning of the fiberglass filter tubes when the tubes are connected or secured to a plate in a conventional manner.

Heretofore, it has been conventional to secure the upper end of a cloth filter tube around a tubular collar by means of a metal strap. Such a holding mechanism does not provide for a positive mounting of the filter tube so the filter tube frequently gets loose and drops off and causes excessive failure when the filter tubes are made from fiberglass. In addition, many of the filter tube applications require a tube having a length of thirty feet or more. Assembly of a filter tube of such length to the collar is difficult since the filter tube is applied to the outer periphery of the collar which depends from a plate.

Filter tubes such as fiberglass may be mounted in accordance with the present invention in a manner which is substantially simpler than those proposed heretofore since one can stand on the filter tube plate and drop the filter tubes into position within the dust collector. The filter tubes are provided with a bead at the upper end thereof and a positive mounting is provided by means of an inner collar which provides a press-fit. Slippage can not occur in the mounting for the filter tubes in accordance with the present invention and damage to the material of the tubes is non-existent.

It is an object of the present invention to provide a novel mounting for filter tubes adpted to be disposed within a dust collector.

It is another object of the present invention to provide a postive mounting for high temperature, low strength filter tubes adapted to be disposed within a dust collector.

It is another object of the present invention to provide a novel mounting for a high temperature, low strength fiberglass filter tube which provides a positive securement which eliminates slippage and damage to the filter material.

It is still another object of the present invention to provide a novel mounting for an end of a filter tube which is more readily assembled than those proposed heretofore.

Other objects will appear hereinafter.

For the purpose of illustrating the invention there is shown in the drawings a form which is presently preferred; it being understood, however, that this invention is not limited to the precise arrangements and instrumentalities shown.

Referring to the drawings in detail, wherein like numerals indicate like elements, there is shown in FIGURE 1 a dust collector designated generally as 10.

Figure 1:
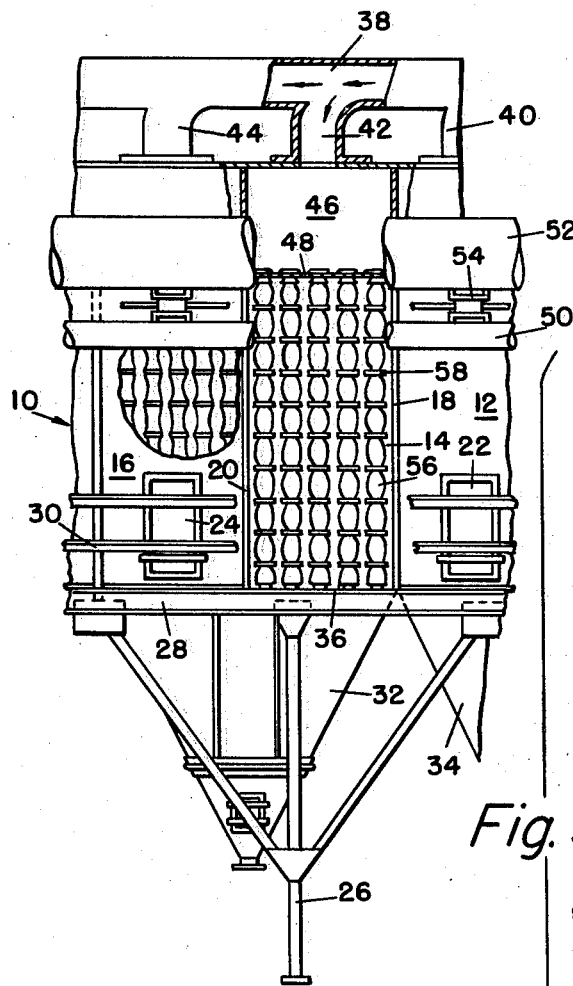
FIGURE 1 is a partial elevational view partly in section of a dust collector wherein filter tubes are mounted in accordance with the present invention.

The dust collector 10 comprises a housing having a plurality of filter compartments 12, 14 and 16. It will be appreciated that a greater or lesser number of compartments may be provided. That is, the mounting for the filter tubes of the present invention is not limited to the number of compartments utilized in a dust collector and may be used in conjunction with a single compartment.

The compartments 12 and 14 are separated by an imperforate partition 18. The compartments 14 and 16 are separated by an imperforate partition 20. The compartment 12 is provided with a door 22 so as to provide access for cleaning and maintenance. Likewise, the compartments 14 and 16 are provided with similar access doors. In this regard, compartment 16 is provided with an access door 24.

The housing for the filter compartments is disposed on a platform 28 supported by a support frame 26. The platform 28 is provided with guard rails 30.

Hoppers for the dust collector 10 are provided beneath the filter compartments, one hopper being provided for each pair of adjacent filter compartments. Thus, hopper 32 is provided for the filter compartments 14 and 16. A hopper 34 is provided for the filter compartment 12 and the filter compartment adjacent thereto.

Each filter compartment 12, 14 and 16 is provided with a perforated bottom tube plate 36. A dust inlet manifold 38 extends across and above the dust collector 10. The manifold 38 is in communication with each of the filter compartments. Thus, the manifold 38 is in communication with the compartment 14 by means of the conduit. The manifold 38 is in communication with the the compartment 14 by means of the conduit 42. Likewise, the manifold 38 is in communication with the compartment 16 by means of the conduit 44. The manifold 38 is in communication with the compartments 12, 14 and 16 at all times.

The cross-sectional area of the conduits 40, 42 and 44 is substantially less than the cross-section area of the filter compartments. That is, the cross-sectional area of conduit 42 is substantially less than the cross-sectional area of the chamber 46 above the top tube plate 48 in the compartment 14. A top tube plate similar to plate 48 is disposed in the compartments 12 and 16.

A back wash air duct 50 and a clean air outlet duct 52 are alternatively in communication with the compartments 12, 14 and 16 by means of an air reversal valve 54. A valve similar to valve 54 is provided for each of the compartments 12, 14 and 16.

Filter tubes 56 having spreader rings 58 disposed at spaced points therealong are suspended within each of the filter compartments from the top tube plate. The tubes 56 are made from a material capable of filtering dust laden gases. Preferably, the tubes 56 are made from a fiberglass material. However, it will be understood that other materials may be used for the tubes 56. When the tubes 56 are made from fiberglass, the spreader rings 58 will not be utilized.

Figure 3:
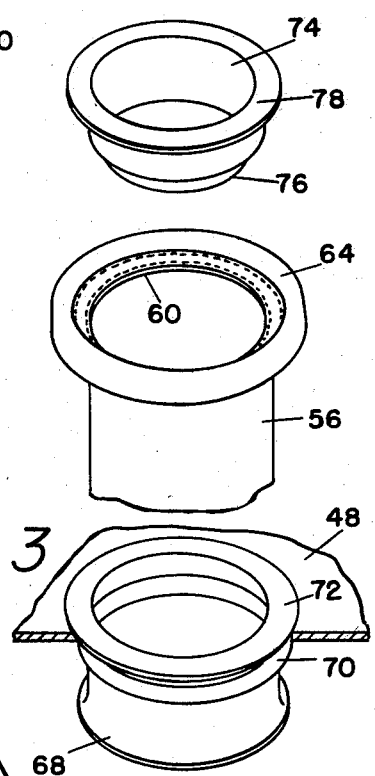
FIGURE 3 is an exploded view of the mounting for the filter tube shown in FIGURE 2.
Figure 2:
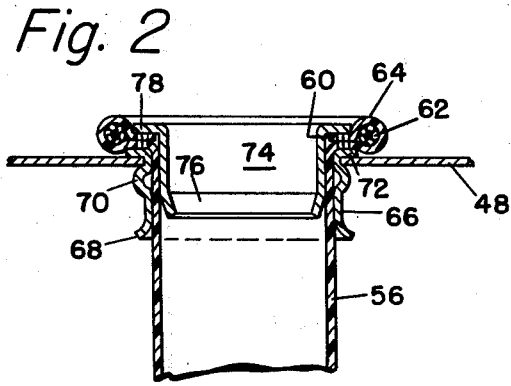
FIGURE 2 is an enlarged sectional view of the mounting for the upper end of a filter tube in accordance with the present invention.

As shown more clearly in FIGURES 2 and 3, the upper end 60 of the tube 56 overlaps an intermediate portion of the tube 56 and is secured thereto by lines of stitching. An annular member 62 such as a piece of rope is disposed within the loop formed by the lines of stitching so as to provide a beaded edge 64 at the upper end of the tube 56. The member 62 may be made of metal, plastic, etc.

The upper end portion of the tube 56 extends through an outer collar 66. The collar 66 is tubular and provided with an outwardly flared lip 68 at one end thereof. An intermediate portion of the outer collar 66 is provided with an annular shoulder 70 which is adapted to be juxtaposed against the lower surface of the top tube plate 48. The other end of the collar 66 extends through a hole in the plate 48 and is swaged over against the upper surface of the plate 48 so as to provide a radially outwardly directed flange 72 which may be welded or soldered in place.

The tube 56 is maintained in assembled relationship with the outer collar 66 by means of an inner collar 74. The inner collar 74 is tubular and is provided with an inwardly directed lip 76 at one end thereof. The other end of the inner collar 74 is provided with a radially outwardly directed flange 78. As shown more clearly in FIGURE 2, the flanges 72 and 78 are disposed side-by-side and may be referred to hereinafter as being juxtaposed to one another. As shown more clearly in FIGURE 2, a portion of the tube 56 adjacent the beaded lip 64 is disposed intermediate the flanges 72 and 78. The outer peripheral diameter of the inner collar 74 is designed so as to provide a press-fit. That is, the radial distance between the outer periphery of the collar 74 and the tube periphery of the collar 66 is slightly less than the thickness of the tube 56.

Figure 4:
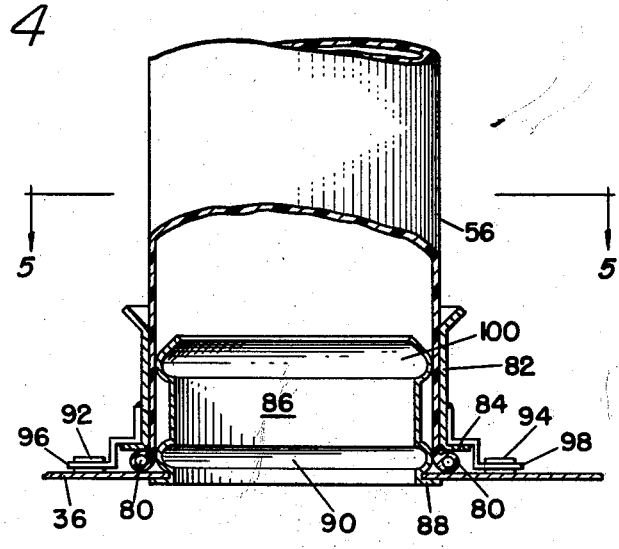
FIGURE 4 is an enlarged section view of the mounting for the lower end of the filter tubes.
Figure 5:
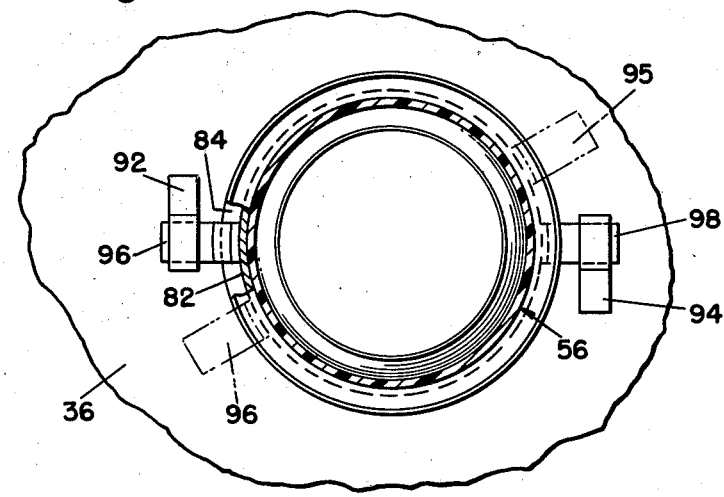
FIGURE 5 is a transverse sectional view.

The lower end of the tube 56 is provided with a novel quick acting mounting means as shown more clearly in FIGURES 4 and 5. A beaded edge 80 is provided at the lower end of the tube 56 in the same manner as the beaded edge 64 at the upper end of the tube 56. An outer collar 82 is disposed around the lower end of the tube 56. The collar 82 is provided at one end with a radially outwardly directed flange 84.

An inner collar 86 extends through a hole in the bottom tube plate 36. A radially outwardly directed flange 88 on the collar 86 is in abutting contact with a lower surface of the plate 36. The inner collar 86 is provided with an annular shoulder 90 in abutting contact with the upper surface of the tube plate 36. Thus, the inner collar 86 is fixedly secured to the plate 36 in the same manner as the inner collar 66 is secured with respect to the plate 48.

The plate 36 is provided with a pair of clips 92 and 94 fixedly secured thereto on the upper surface thereof. Each of the clips 92 and 94 is provided with a portion spaced from and parallel to the upper surface of plate 36, a depending portion which is substantially perpendicular to the upper surface of plate 36, and a leg which overlies and is fixedly secured to the plate 36. The legs are secured to the plate 36 on opposite sides of a diametrical line extending through the inner collar 86, thereby defining oppositely directed channels.

The outer collar 82 is provided with diametrically opposite radially directed lugs 96 and 98. The lug 96 is adapted to be retained in the channel beneath a leg of the clip 92. The lug 98 is adapted to be retained in the channel beneath a leg of the clip 94. When the lugs 96 and 98 are so retained, the flange 84 and the shoulder 90 prevent the beaded edge 80 from passing therebetween. Also, an annular portion of the tube 56 is held firm by the outer collar 82 and an annular shoulder 100 on the inner collar 86.

The operation of the dust collector 10 is as follows:

High temperature dust laden gases are conveyed to the dust collector 10 by the manifold 38. Such dust laden gases are conveyed to the filter compartments by the conduits 40, 42, and 44. The dust laden gas enters the tubes 56 in a downward direction. The gases pass through the filter tubes 56 and enter the clean air outlet duct 52 for recirculation to the system. When the gases are passing into the clean air outlet duct 52, the valve 54 is blocking communication between the filter compartments and the back wash air duct 50.

When it is desired to clean the filter tubes of one compartment, the valve means for said compartment is repetitively opened and closed so as to alternatively place the compartment in communication with the ducts 50 and 52. The repetitive operation of the valve for one of the compartments causes the tube 56 to alternatively expand and contract. When spreader rings are provided on the tubes, the expansion and contraction of the filter tube 56 is between adjacent spreader rings 58. For example, compare the portions between the spreader rings on the filter tubes in compartments 14 and 16. This movement of the tubes causes dust particles accumulating on the inner surface of the tubes to be collected in the hoppers therebelow.

It is submitted that the above description of the operation of the dust collector 10 is sufficient for an understanding of the problems associated with the mounting of the filter tubes. A more detailed explanation of the operation of the dust collector 10 may be found in application Serial No. 749,898, filed on July 21, 1958, by Robert R. Leech et al., now Patent No. 3,078,646 and entitled: Dust Collector.

The filter cloth tubes 56 are mounted as follows:

An outer collar 66 is secured within each of the holes in the top plate 48 as shown more clearly in FIGURE 2. Then the filter cloth tubes 56 are fed through the collar 66 by an operator standing on the plate 48. The beaded edge 64 is disposed around the flange 72 as shown more clearly in FIGURE 2. Then the inner collar 74 is mounted as shown more clearly in FIGURE 2. In this manner, it is possible to mount the upper end of the tubes from a position outside of the filter compartments.

Once the upper end of a filter tube is secured, the lower end will be secured by an operator who will be standing on the bottom tube plate 36 inside the filter compartment. The inner collar will be secured in the hole in the plate 36 in the manner illustrated in FIGURE 4. The outer collar 82 is placed around the lower end of the filter tube and reciprocated in a direction toward the upper end of the filter tube. Then the lower end of the filter tube is disposed so that it surrounds the inner collar 86 as illustrated in FIGURE 4.

Thereafter, the outer collar 82 is reciprocated toward the plate 36 until the lugs 96 and 98 are juxtaposed to the upper surface of the plate 36 in the phantom position illustrated in FIGURE 5. Then the collar 82 is rotated to the solid line position shown in FIGURE 5. This locks the outer collar 82 in place.

Thus, it will be seen that the mounting of the upper and lower ends of the tube is quick, provides for a positive securement of the filter tube, and may be accomplished by unskilled laborers.

The clamping of the tubes 56 in a horizontal plane between the flanges 72 and 78 provides a positive securement for the filter tubes. The beaded edge 64 prevents slippage between the filter tubes and collars 66 and 74.

The positive mounting of the tubes 56 and the elimination of the possibility of slippage completely eliminates the possibility of damage to the material of the tubes 56 as the tubes 56 are expanded and contracted during the cleaning operation of the tubes. Removal of the tubes 56 is a simple matter. A tool similar to a bottle opener is utilized to remove the inner collar 74. Such tool will pull on a lower edge of the flange 78 while pushing against the diagonally opposite edge of the flange 78.

When the inner collar has been removed from the lower end of the tube 56, then the tube 56 may be withdrawn through the filter compartment and the outer collar 66 into the chamber 46.

The mounting for the filter tubes in accordance with the present invention greatly extends the life of the filter tube. This is especially true when the filter tube is made of fiberglass. Also, the mounting enables a filter tube to be replaced more readily than was possible heretofore with conventional mounting means. By using fiberglass material for the filter tubes of the present invention, it is possible for the dust collector 10 to be utilized with systems having dust laden gas which have a temperature up to 500° F.

While the tubes of the present invention are preferably made from a flexible fiberglass material, it will be appreciated by those skilled in the art that other high temperature, flexible synthetic resins as well as cotton, wool, silk, etc. may be utilized as the material for the filter tubes.

The present invention may be embodied in other specific forms without departing from the spirit or essential attributes thereof and, accordnigly, reference sshould be made to the appended claims, rather than to the foregoing specification as indicating the scope of the invention.

I claim:

1. A mounting for filter tubes comprising upper and lower plates, said plates being substantially parallel to each other and having aligned holes therethrough, an outer tubular collar extending through a hole in said upper plate, one end portion of a filter tube of flexible material extending through said collar, an inner collar disposed within said one end of said tube, a flange on said inner collar, said flange being juxtaposed to the upper surface of a portion of said upper plate with a portion of said tube disposed therebetween, a second inner collar extending through a hole in said lower plate, said second inner collar having a radially outwardly directed flange at its lower end juxtaposed to the lowermost surface of said lower plate adjacent the hole in said lower plate, the other end portion of said tube surrounding said second inner collar, a second outer collar surrounding said other end portion of said tube, means releasably securing said second outer collar with respect to said lower plate, each set of collars cooperating with a portion of the tube therebetween to prevent slippage of said tube with respect to said collars.

2. A mounting in accordance with claim 1 wherein each end of said tube is provided with a beaded edge, said beaded edges having dimensions greater than the radial distance extending between the inner and outer collars at each end of the tube.

3. A mounting in accordance with claim 1 wherein said means releasably securing said second outer collar with respect to said lower plate includes at least one radially outwardly directed lug on said second outer collar, a clip on said lower plate, a portion of said clip being spaced from said lower plate so as to define a channel, and said second outer collar being rotatable about its longitudinal axis so as to dispose said lug within said channel.

4. A mounting for filter tubes comprising upper and lower plates, said plates being substantially parallel to each other and having aligned openings therethrough, a first outer tubular collar extending through a hole in said upper plate, means coupling said collar to said upper plate including a radially outwardly directed flange on said collar overlying the upper surface of said plate adjacent to said hole, one end portion of a filter tube of flexible material extending through said collar and overlying said flange, a first inner tubular collar disposed within said one end portion of said tube, a radially outwardly directed flange on said inner collar, the flanges on said first inner and outer collars being juxtaposed parallel to each other with a portion of said tube being disposed therebetween, a second inner collar extending through a hole in said lower plate, said second inner collar having a radially outwardly directed flange on its lower end juxtaposed to the lower surface of said lower plate, the other end portion of said tube surrounding said second inner collar, a second outer collar surrounding said other end portion of said tube and clamping said other end portion of said tube to said lower plate, means releasably securing said second outer collar with respect to said lower plate, and each set of collars having opposed peripheral surfaces cooperating with a portion of said tube extending therebetween to prevent slippage of said tube with respect to said collars.

5. A mounting in accordance with claim 4 wherein a substantial portion of said first inner and outer collars have opposed peripheral surfaces, the radial distance between the outer opposed peripheral surface of said first inner collar and the inner opposed peripheral surfaces of said first outer collar being slightly less than the thickness of said filter tube.

6. A mounting in accordance with claim 4 wherein said filter tube is made from fiberglass, whereby said filter tube may be utilized in a high temperature filtering system.

7. A mounting in accordance with claim 4 wherein said second inner collar includes a radially outwardly directed portion axially spaced from its flange, said lower plate lying in a plane between said second inner collar flange and radially outwardly directed portion thereof, and a portion of said second outer collar cooperating with the radially outwardly directed portion of said second inner collar to prevent said tube from slipping therebetween.

References Cited by the Examiner

UNITED STATES PATENTS

| 735,905 | 8/03 | Picher et al. | |
|---|---|---|---|
| 1,168,544 | 1/16 | Newlin | 210—474 |
| 1,390,966 | 9/21 | Beth | 55—341 |
| 1,454,492 | 5/23 | Stroud | 55—341 |
| 1,592,018 | 7/26 | Villers | 210—475 |
| 1,703,681 | 2/29 | Miller | 55—374 |
| 1,888,741 | 11/32 | Schellin | 285—255 |
| 2,335,315 | 11/43 | Seymour | 55—341 |
| 2,612,236 | 9/52 | Vedder. | |
| 2,805,731 | 9/57 | Kron | 55—375 |

FOREIGN PATENTS

| 708,336 | 4/31 | France. |
|---|---|---|
| 1,152,252 | 9/57 | France. |

HARRY B. THORNTON, *Primary Examiner.*

HERBERT L. MARTIN, *Examiner.*